UNITED STATES PATENT OFFICE.

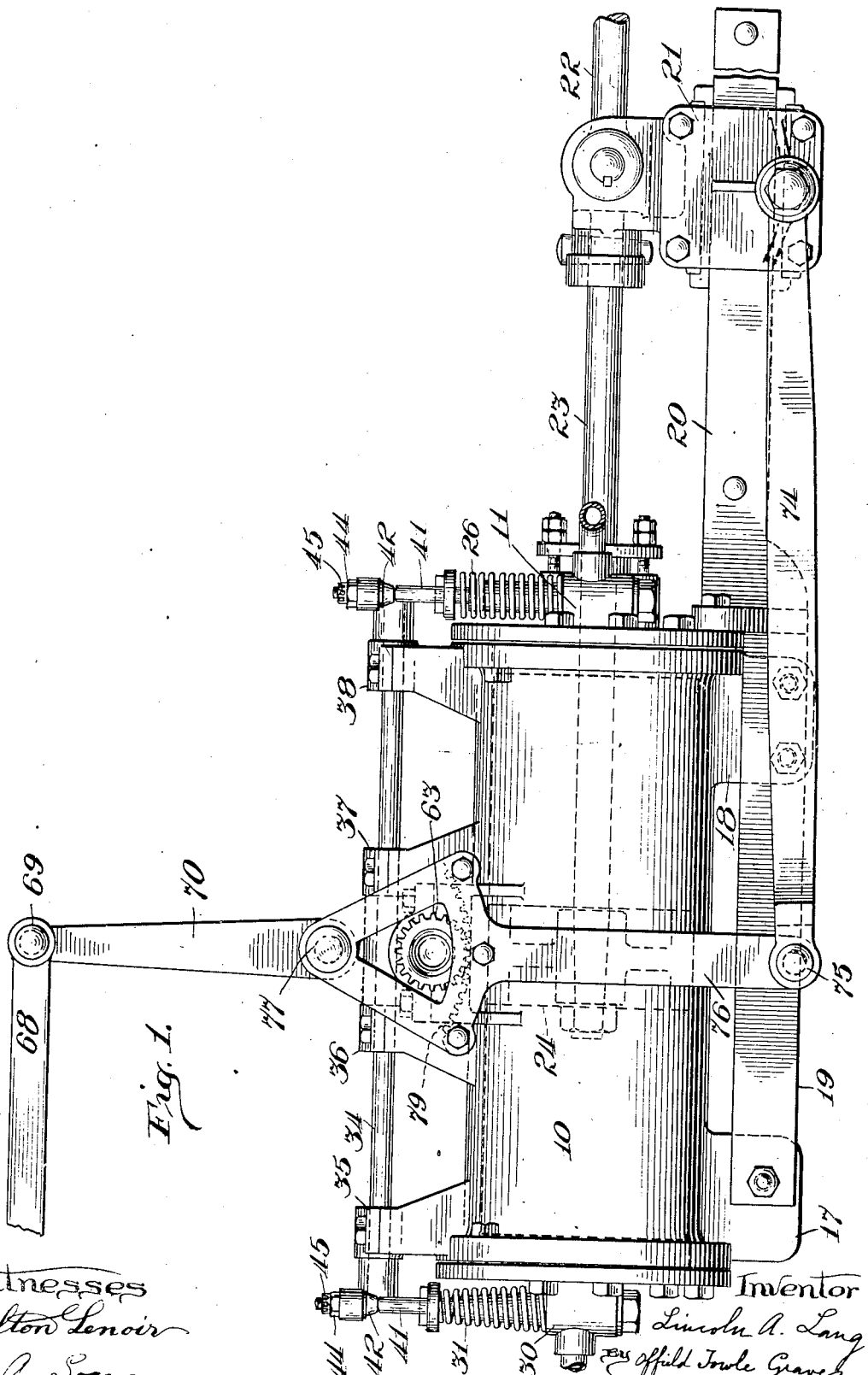

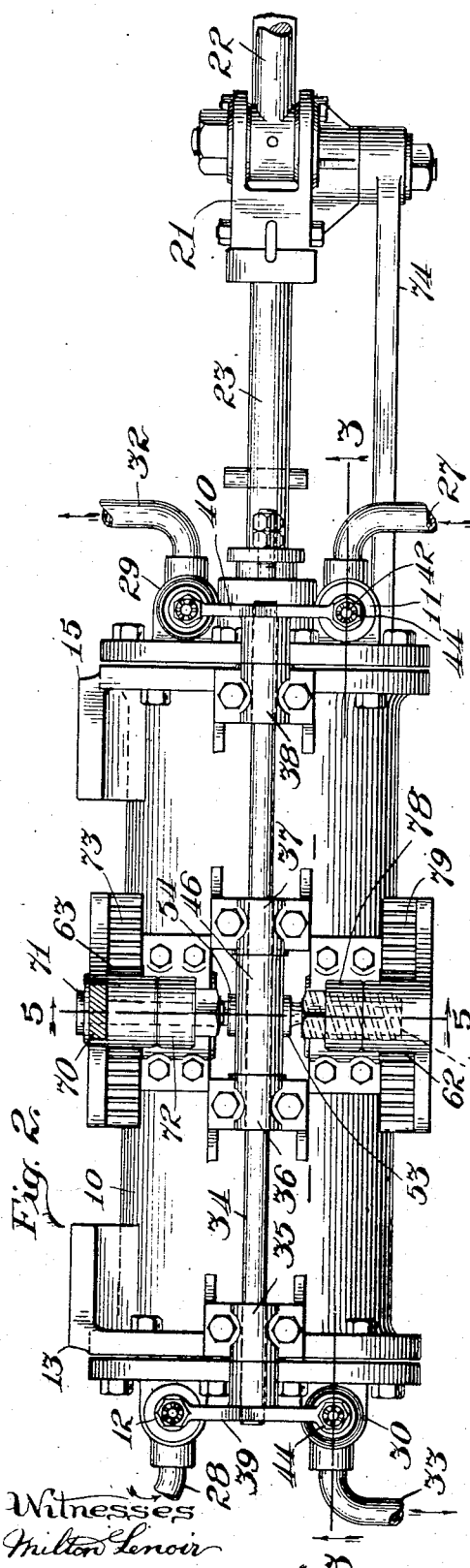

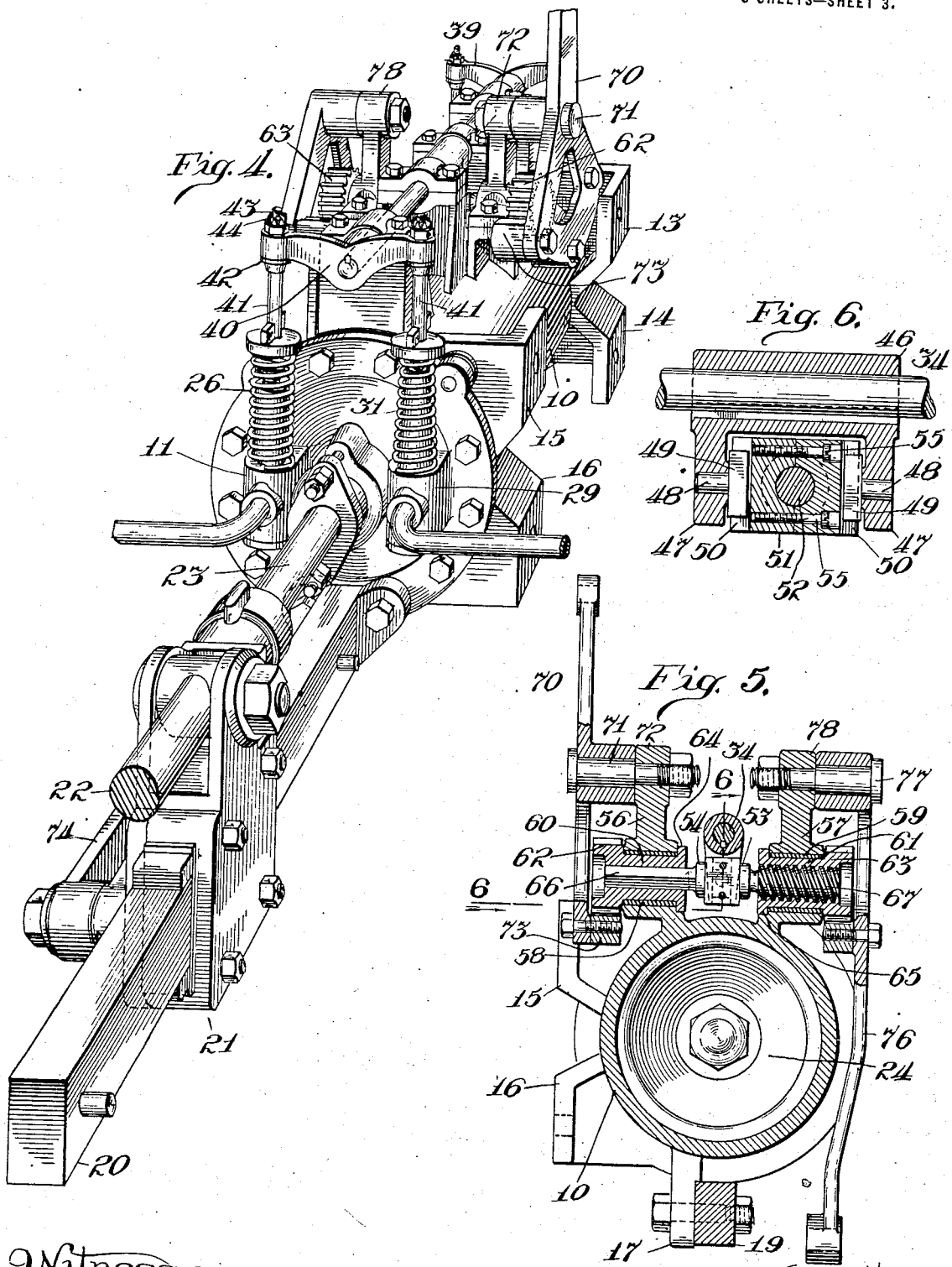

LINCOLN A. LANG, OF CHICAGO, ILLINOIS, ASSIGNOR TO THE NORTHERN TRUST COMPANY, OF CHICAGO, ILLINOIS, A CORPORATION OF ILLINOIS, AS TRUSTEE.

SERVO-MOTOR.

1,324,558.  Specification of Letters Patent.  Patented Dec. 9, 1919.

Application filed March 13, 1916. Serial No. 83,811.

*To all whom it may concern:*

Be it known that I, LINCOLN A. LANG, a citizen of the United States, residing at Chicago, in the county of Cook and State of Illinois, have invented certain new and useful Improvements in Servo-Motors, of which the following is a specification.

My invention relates to improvements in controlling apparatus, and has particular reference to a type of controlling mechanism suitable for manually controlling power-actuated mechanisms, such as locomotive link reversing gears, ship steering devices, and analogous mechanisms which are to be moved into various different positions and require the exercise of a large amount of power for effecting such movements.

The invention is in the nature of an improvement upon the invention described in my previous United States patent application filed April 24, 1915, Serial No. 23,582. This invention differs from that described in the above application in that no provision is made for transmitting manual power to the part whose movement is to be controlled, the shifting of the latter being effected by power only.

The object of the invention is to provide an improved, efficient, and relatively simple and inexpensive apparatus for moving by power into any desired position a load member, the position of which is determined by the amount of movement imparted to a manually controlled handle or the like.

In the drawings accompanying this application I have illustrated as a specific application on my invention a controlling apparatus well adapted for use in connection with locomotive link reversing gears. In said drawings—

Figure 1 is a side elevation of the apparatus;

Fig. 2 is a plan view of the apparatus shown in Fig. 1;

Fig. 3 is a section taken on the line 3—3 of Fig. 2;

Fig. 4 is a perspective view of the apparatus;

Fig. 5 is a section taken on the line 5—5 of Fig. 2; and

Fig. 6 is a section taken on the line 6—6 of Fig. 5.

In the apparatus shown, the motive power for operating the link reversing gear is furnished by compressed air which is admitted to the cylinder 10 through a pair of puppet valves 11 and 12 which communicate respectively with the opposite ends of the cylinder 10. The air cylinder 10 is secured to the frame of the locomotive by means of a set of integral cast lugs 13, 14, 15, and 16, and secured to a pair of lugs 17 and 18 depending from the cylinder casting is a substantial longitudinal bar 19 the outer end 20 of which constitutes a guide for the sliding cross-head 21. The cross-head 21 is connected by means of a pivoted link 22 with the link motion of the locomotive and on the other side is connected by means of a piston rod 23 with the piston 24 of the air cylinder.

The intake valves 11 and 12 are of the puppet type and are maintained firmly in engagement with their seats 25 by means of rather stiff coil springs 26. The air passages are arranged in such a manner that the pressure of the air, which is in direct communication with the pipes 27 and 28, tends to close the valves and assist the springs in making them air-tight. The exhaust valves 29 and 30 are also of the puppet type and are maintained in engagement with their seats by means of springs 31, the arrangement also being such that the pressure of air inside the cylinder tends to force the valves into engagement with their seats. The exhaust pipes 32 and 33 are preferably in direct communication with the atmosphere. The entire system of valves is operated by means of a single longitudinal rock shaft 34 which is journaled in a set of bearings 35, 36, 37, and 38 carried at the top of the cylinder casting, a rotary movement of said shaft resulting in angular movements of the rocker arms 39 and 40, the outer ends of which engage the upper ends of the valve stems 41. The adjustment of the valves is effected by means of the tappet pins 42 which are threaded in the ends 43 of the arms and locked in position by means of nuts 44. In order to prevent unauthorized persons from tampering with the adjustments of the valves, the nuts 44 are preferably castellated and provided with locking pins 45. The intake valves are also arranged so that the gland adjusting nuts 46 are contained within the interior of the springs 26 and thus are made non-accessible unless the springs be removed.

Intermediate the bearings 36 and 37 and on the rock shaft 34 is keyed a forked arm 46 (see Fig. 6), the depending portions 47 of which are drilled out parallel with the rock shaft axis in order to accommodate pins 48. The inner adjacent ends of said pins 48 are equipped with heads 49 rectangular in cross-section which are arranged to slide in vertical grooves 50 milled out in the opposite sides of the rectangular collar 51. The collar 51 is bored out centrally in order to fit rotatably upon the control rod 52, the latter being provided with integral collars 53 and 54 in order to prevent endwise movement of said collar 51. In order to permit of the collar 51 being placed in position on the rod 52 between the collars 53 and 54, it is made in two portions, as shown in Fig. 6, the two separate portions being joined together by removable screws 55. It will be observed that the arrangement is such that an endwise movement of the control rod 52 will result in a rocking movement of the shaft 34, binding of the various parts due to the angular movement of the arm 46 being prevented by the parts 49 sliding in the grooves 50 as the rock shaft is rotated. The control rod 52 is freely rotatable in the collar 51.

Endwise movement of the control rod 52 is differential in character, being controlled by two factors: first, the movement imparted to it manually by the operator; and second, the reverse movement imparted to it under the influence of the piston in the air cylinder. The differential control rod 52 is mounted transversely of and slightly above the cylinder casting in a pair of supporting lugs 56 and 57 arranged at either side of the longitudinal rock shaft 34, (see Fig. 5). The intermediate portions of said lugs 56 and 57 are equipped with bronze bushings 58 and 59 within which rotate the necks or hubs 60 and 61 of a pair of spur gears 62 and 63. The adjacent ends of said hubs are enlarged to form shoulders 64 and 65 which prevent axial movement of said gears 62 and 63 in their bearings in the supporting lugs 56 and 57. The pinion 62 is broached out centrally throughout its entire length so as to slidably accommodate the squared end 66 of the control rod 52, and the pinion 63 is threaded internally in order to receive the opposite threaded end 67 of the control rod 52.

The apparatus is preferably located on the locomotive in a convenient position for attaching the rod 22 to the link motion. The link 68 extends back into the cab of the locomotive where it is attached to a suitable lever with a sector arm or other customary arrangement for locking the apparatus in any desired position. The front end of said link 68 is pivoted at 69 to an upstanding lever 70 which is pivotally supported on a pin 71 secured in the upper end 72 of the supporting lug 56. The lower end of the lever 70 is enlarged, as shown in Fig. 4, and carries an internal sector-shaped rack 73 which meshes with the under side of the pinion 62. To the lower end of the cross-head 21 I pivotally connect a rearwardly extending link 74 the back end of which is pivotally connected at 75 to the lower end of an arm 76. The upper end of said arm 76 is pivoted upon a fixed pin 77 secured in the upper end 78 of the supporting lug 57. The lever 76 is equipped with a toothed sector-shaped rack 79, similar to the rack 73, and meshing with the under side of the gear 63.

Describing the operation of the apparatus, when the engine-runner desires to reverse the engine or change the cut-off he imparts a longitudinal movement to the link 68 and thus effects angular movement of the lever 70. Such angular movement of the lever 70 causes the sector arm 73 to rotate the pinion 62, and the control rod 52 revolves a corresponding amount. The rotation of the control rod 52 causes the threads 67 to coöperate with the threads in the axially fixed pinion 63, and an endwise movement of the control rod thus results. Said endwise movement of the control rod 52 causes the arm 46 to rock on its axis and with it the rock shaft 34 and the rocker arms 39 and 40. Assuming that the direction of movement of the link 68 has been such as to depress the ends of the rocker arms over the valves 11 and 30, said valves will open, admitting pressure air to the front end of the cylinder and permitting the other end to exhaust. The piston 24 will thereupon move backwardly and with it the piston rod 23 and cross-head 21. When the cross-head 21 has moved a proportionate amount, corresponding to the movement of the link 68, the valves automatically close and further movement of the cross-head and piston is instantly arrested. This is accomplished through the link 74 and associated parts. When the cross-head moves back, the link 74 causes a rearward movement of the arm 76, and the sector arm 79 rotates the pinion 63 which coöperates with the threads 67 on the end of the control rod 52 to cause the latter to move longitudinally in a direction opposite to that which had been imparted to it by the movement of the pinion 62 under the influence of the manually operated link 68.

When the movement of the link 68 is reversed, the rock shaft 34 will rotate in the other direction and cause the opening of the valves 12 and 29, moving the piston 24 in a forward direction, its movement being arrested automatically in the same manner as when the link 68 was moved in the first direction. It should of course be understood that the threads 67 are pitched in the proper direction in order to effect such automatic stoppage of the movement of the cross-head after a predetermined amount of movement of the manually operated link 68.

In practice the adjustment of the valve is such that the exhaust valves are closed but the intake valves are opened a minute amount so as to compensate for leakage and in order to insure the immediate operation of the valve mechanism if the cross-head 21 is subject to exterior forces which may have a tendency to cause a movement or creeping of the piston. The use of independent valves for this purpose is important in order to insure instantaneous operation of the piston whenever the slightest amount of movement is imparted to the rock shaft.

It will be manifest that my invention is capable of many applications and is not limited to use in connection with locomotive reversing gears. The construction and gearing is such that a comparatively small amount of manual force applied to the link 68 is sufficient to actuate the valve mechanism. The cylinder of course can be made as large as is necessary to do the work required of it.

Inasmuch as the apparatus shown herein may be considerably modified to suit individual requirements, the details of construction have been described without any intention of limiting the invention, the scope of which must be determined by reference to the appended claims.

I claim—

1. In servo-motor mechanism, the combination of a load member, a handle, a pair of axially-alined rotary members respectively connected to the handle and the load member for rotary movement thereby, a shaft slidable in one of said rotary members and threaded into the other rotary member, a rock-shaft rotatable by axial movement of said first shaft in either direction, and mechanism controlled by said rock shaft for controlling the movement of said load member.

2. In servo-motor mechanism, the combination of a load member, a handle, a pair of axially-alined rotary members respectively connected to the handle and the load member for rotary movement thereby, a shaft slidable in one of said rotary members and threaded into the other rotary member, a rock-shaft provided with an arm, said first shaft being rotatably connected to said arm, said rock-shaft being rotatable by said arm upon axial movement of said first shaft in either direction, mechanism controlled by said rock-shaft for controlling the movement of said load member, and means rotatably supporting both of said rotary members while preventing the axial movement thereof.

3. In servo motor mechanism, the combination of a load member, a handle, a pair of axially-alined rotary members respectively connected to the handle and the load member for rotary movement thereby, an axially movable shaft axially alined with said rotary members, slidable with reference to one of said rotary members and having screw-threaded engagement with the other rotary member, a rock shaft rotatable by axial movement of said first shaft, and mechanism controlled by said rock shaft for controlling the movement of said load member.

LINCOLN A. LANG.